United States Patent [19]
Kumbera et al.

[11] 4,154,993
[45] May 15, 1979

[54] CABLE CONNECTED DRAWOUT SWITCHGEAR

[75] Inventors: David G. Kumbera, Milwaukee; Edward Litzow, South Milwaukee, both of Wis.

[73] Assignee: McGraw-Edison Company, Elgin, Ill.

[21] Appl. No.: 836,771

[22] Filed: Sep. 26, 1977

[51] Int. Cl.² ............................................. H01H 9/20
[52] U.S. Cl. .............................................. 200/50 AA
[58] Field of Search ........... 200/50 A, 50 AA, 144 B, 200/162, 163; 339/111, 143 R, 252 P, 95 A; 361/335, 336, 337

[56] References Cited
U.S. PATENT DOCUMENTS

| | | | |
|---|---|---|---|
| 3,453,587 | 7/1969 | Neidecker | 339/95 A X |
| 3,595,984 | 7/1971 | Tachick | 339/111 X |
| 3,783,209 | 1/1974 | Cleaveland et al. | 200/50 AA |
| 3,814,881 | 6/1974 | Cherry et al. | 200/144 B |
| 3,930,709 | 1/1976 | Stanger et al. | 339/111 |

*Primary Examiner*—James R. Scott
*Attorney, Agent, or Firm*—Thomas E. McDonald; Jon Carl Gealow; Ronald J. LaPorte

[57] ABSTRACT

A drawout switchgear assembly which can be disconnected from a shielded cable electric distribution system under energized cable conditions. Each of the switchgear source and load bushings is held within a stationary cable connector with sufficient pressure exerted by the switchgear drawout operating mechanism to maintain a waterproof, fully shielded connection. Each stationary cable connector includes a current exchange bayonet member carrying a louvered band having resilient contact fingers which engage the movable switchgear bushing rod within a cavity of this rod for receiving the bayonet member. A switchgear drawout operating mechanism includes a mechanical interlock which allows withdrawal or reconnection of the switchgear only when the switchgear is in its open position.

8 Claims, 11 Drawing Figures

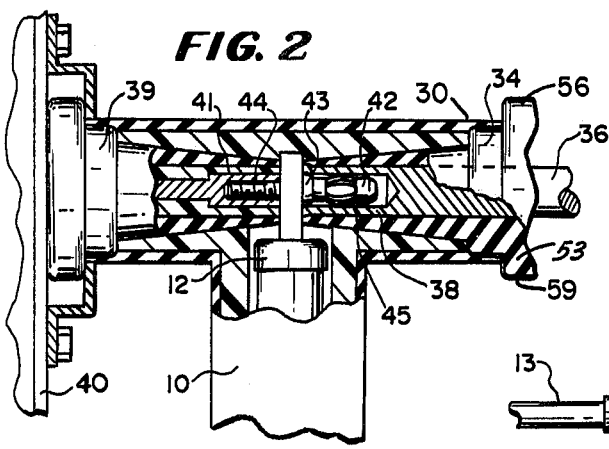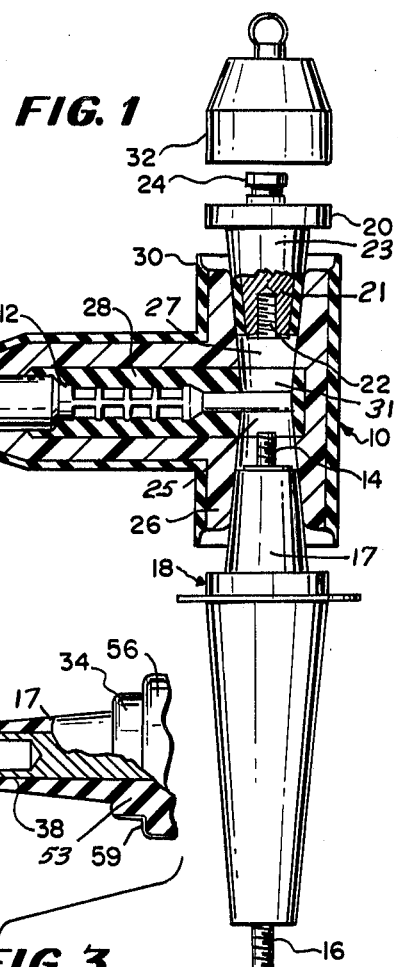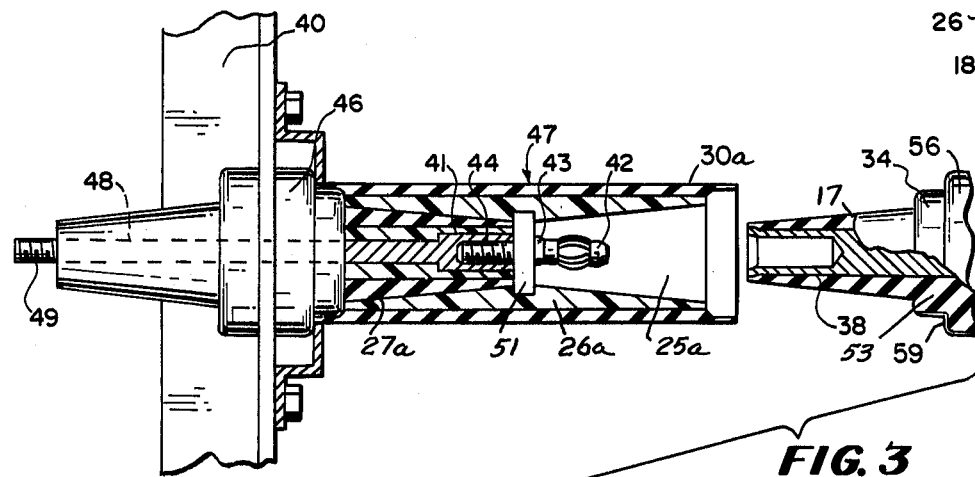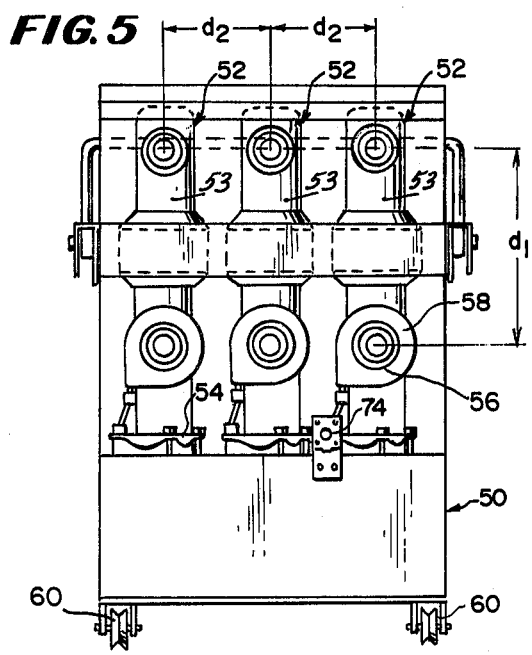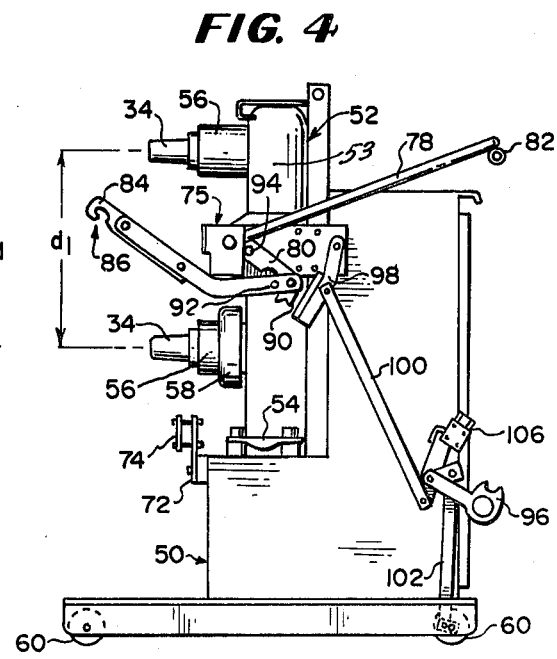

CABLE CONNECTED DRAWOUT SWITCHGEAR

BACKGROUND OF THE INVENTION

The invention relates generally to draw out switchgear for electric power systems, and more particularly to drawout switchgear for use with underground cable distribution systems.

Various safety codes and operating procedures for underground power systems require a visible break disconnect be disposed between submersible power distribution equipment, such as switchgear or power transformers, and the shielded underground feeder cables to this equipment. Provisions for performing routine maintainence work on the cable system, such as line energization checks, grounding, fault location, or hipotting, may also be required. To comply with these requirements, switchgear apparatus for underground power systems generally are equipped with standardized source and load terminal bushings which, when connected with respective matching cable connectors that include provisions for performing the above mentioned routine maintenance work, form fully shielded, waterproof, current exchange assemblies between the feeder cables and the switch-gear bushing terminals. These standardized cable connectors are commercially available for various standard voltage ratings up to 23Kv phase-to-ground, at a continuous current rating of either 200 or 600 amperes. These connectors may be either load-break type connectors, such as that described in U.S. Pat. No. 3,930,709 issued Jan. 6, 1976 to Stanger et al, or non-load break type connectors, which are designed to be connected or disconnected by one man with a standard hot line tool.

Typical underground shielded cable consists of many strands of wire (copper or aluminum) which is first wrapped with a semi-conducting shielding material. Next, a layer of insulation (usually a polyethylene material) is added, followed by an outside layer of semi-conducting shield material. Finally, the neutral wires are spirally wound about this outside layer. Depending on the voltage class, submersible cable may be in the order of two inches in diameter and, because of its construction described above, is relatively inflexible and has a large minimum bending radius. As a result, the space requirements for movement of the cable connector assembly connecting feeder cables to underground switchgear is considerable. For a three phase switchgear device, six cables and cable connectors are required, which results in a large space requirement solely for these cable connectors.

Generally the underground switchgear bushing has an axially threaded terminal to which the cable connector is attached by bolting thereto. Because of the size and stiffness of 600 ampere cables and cable connectors and this bolt-nut method of attachment, as well as the fact that each feeder cable must be individually connected or disconnected, considerable time is required to disconnect or reconnect underground switchgear equipment.

SUMMARY OF THE INVENTION

In the present invention, a cable-connected switchgear device is disconnected by moving the switchgear, rather than the cable connectors. Since the cables are stationary, there is no additional cable space requirement for disconnecting these cables as a result of the large cable bending radius. Also, much less time is required to connect or disconnect the switchgear, since a single disconnect operating mechanism is used, both to disconnect or reconnect all of the switchgear source and feeder cables simultaneously, and to apply sufficient pressure between each switchgear bushing and its associated cable connector to maintain a dielectric and environmental seal therebetween, without the need of individually bolting each cable connector to its associated switchgear bushing.

A circuit interrupter is mounted on a movable carriage having flanged wheels which roll along guide rails attached to a stationary support structure. The circuit interrupter bushings are aligned with respective cable connectors disposed at one end of the stationary support structure, so that when the movable carriage is rolled towards the cable connectors, each switchgear bushing is simultaneously engaged with its associated cable connector. The end of each switchgear bushing rod is recessed to receive and engage a stationary current exchange bayonet member disposed within each cable connector.

The switchgear disconnect operating mechanism includes an engaging member having a hooked end which engages a U-bolt fastened to the support structure when the switchgear carriage is moved toward its connected position. The operating handle of a toggle type switchgear disconnect operating mechanism can then be rotated toward its toggle position to move the engaging member away from the cable connectors and thus pull the switchgear carriage towards the cable connectors, so that the switchgear bushings and the cable connectors are held together with sufficient pressure to form a dielectric and environmental seal therebetween when the handle has been rotated to its toggle position. When the operating handle is rotated in the reverse direction, this dielectric and environmental seal is broken and the switch-gear is disconnected and moved away from the cable connectors.

The switchgear disconnect operating mechanism is interlocked with a trip and reset lever of the interrupter operating mechanism so that the switchgear can be connected or disconnected from the cable connectors only when the circuit interrupter is in its opened or tripped position, to thus assure that the switchgear disconnect does not close on, or interrupt, load current.

Each of the stationary contacts of the switchgear disconnect, that is, the bayonet members disposed within each cable connector, carries a louvered band having resilient contact fingers for engaging an associated switchgear bushing rod within its recessed end. The use of these louvered bands allows each of the bushing-connector current exchanges to withstand high fault currents, up to twenty times its rated continuous current for three seconds, without damage.

BRIEF DESCRIPTION OF THE DRAWINGS

FIG. 1 is an expanded, side view of a typical cable elbow connector, in partial cross section.

FIG. 2 is a cross sectional view of a cable connector switchgear bushing current exchange according to the invention, shown in its connected position.

FIG. 3 is a cross sectional view of another cable connector and switchgear bushing current exchange according to the invention, shown in its disconnect position.

FIGS. 4 and 5 are respectively side and front views of a moveable drawout switchgear assembly, according to the invention.

DESCRIPTION OF THE PREFERRED EMBODIMENT

Figure 6:
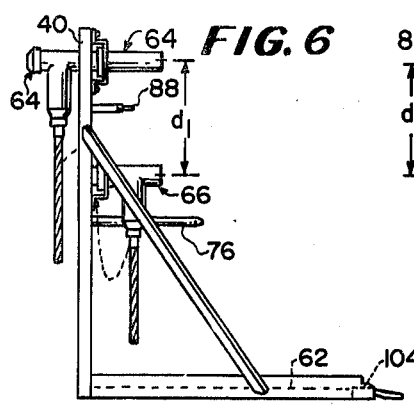
FIGS. 6 and 7 are respectively side and front views of a stationary support structure for use with the drawout switchgear assembly of FIGS. 4 and 5.

FIG. 1 illustrated a typical cable elbow connector 10 similar to the ESNA type 650-LR elbow connector manufactured by the Elastimold Division of the Amerace-Esna Corporation, Hackettstown, N. J. 07840. The elbow connector 10 includes a spade connector 12 having one end which is crimped to a feeder cable conductor 13, and an opposite end which fits over a threaded terminal stud 14 forming one end of a bushing rod 16, which extends from a free end tapered portion 17 of a switchgear bushing 18. An insulating plug 20 includes a metallic insert 21 which defines a threaded bore 22 therein for receiving and holding the threaded stud 14 and which is disposed at a tapered end portion 23 of the insulation plug 20. Another metallic insert at the opposite end of the insulating plug 20 includes a hex nut 24 which is fully insulated from the insert 21 at the other end of the insulating plug 20. The spade connector 12 is securely fastened to the bushing rod 16 by turning the hex nut 24 of the plug 20 to engage the terminal stud 14 within the threaded bore 22 of the insulating plug 20.

The elbow connector 10 includes an inner layer 26 of elastomeric insulating material which is bonded to a conductive rubber inner layer 28. The conductive rubber inner layer 28 surrounds the crimped spade connector 12, to provide an internal shield for relieving any voltage stresses. An outer jacket 30 of the elbow connector 10 consists of molded conductive material that is bonded to the elastomeric inner layer 26. In addition to protecting the elbow connector 10 from abrasion and the natural elements, the outer jacket 30 picks up and maintains continuity of the feeder cable shield to the switchgear apparatus.

The outer jacket 30 and the elastomeric inner layer 26 define: a first tapered opening 25 for receiving the free end tapered portion 17 of the switchgear bushing 18; an opposite, second tapered opening 27 for receiving the tapered end portion 23 of the insulating plug 20; and a third opening 29, orthagonal to the first and second openings 25 and 27, of the elbow connector 10, for receiving the feeder cable conductor 13. The outer jacket 30 and the elastomeric inner layer 26, together with the conductive rubber inner layer 26, define a common passage 31 between the three openings 25, 27 and 29 of the elbow connector 10, for receiving the spade connector 12.

When the terminal stud 14 is fully engaged within the threaded bore 22, the switch-gear bushing 18 and the insulating plug 20 are both drawn into the jacket 30 to tightly compress the elastomeric inner layer 26 therein and form a waterproof, fully shielded connection between the feeder cable 13 and the switchgear.

The hex nut 24 can also be used as a capacitive voltage test point to determine whether or not the feeder cable is energized without disturbing the cable connection. A voltage test point cap 32 of molded conductive material fits over the hex nut 24 onto the connector housing 30 to electrically and mechanically shield the hex nut 24.

FIG. 2 shows the elbow connector 10 of FIG. 1 and a switchgear bushing 34, which is similar to the switchgear bushing 18 of FIG. 1 except for the modifications described herein which have been made so that the switchgear bushing 34 is suitable for use as the movable element of a drawout switch-gear disconnect. These modifications include replacing the terminal stud 14 and bushing rod 16 of the switchgear bushing 18 shown in FIG. 1 with a bushing rod 36 having an end surface which defines an axial bore or cavity 38.

The fixed switchgear disconnect member comprises the elbow connector 10 and a dead end plug 39 equivalent to the insulating plug 20, which are connected together and disposed on a fixed support structure 40. The dead end plug 39 has a metallic insert which defines a threaded bore 41, similar to the threaded bore 22 of the insulating plug 20, for receiving a current exchange bayonet member 42. The current exchange bayonet member 42 includes a flanged portion 43, a threaded portion 44 extending between one end of the bayonet member 42 and the flanged portion 43, and a louvered band contact element 45 which is disposed about the bayonet member 42 intermediate the flanged portion 43 and an opposite end of the bayonet member 42. The louvered band contact element 45 is described in U.S. Pat. No. 3,453,587, issued July 1, 1969 to Rudolph Neidecker, the subject matter of this patent being incorporated herein by this reference. The louvered band 45 comprises an elongated conductive strip member, disposed about the bayonet member 42, having transversely extending expanses thereof bent or twisted with respect to the strip member so as to provide resilient contact fingers for engaging surfaces on opposite sides of the strip.

The spade terminal 12 is fastened to the dead end plug 39 by the bayonet member 42 by inserting the threaded portion 44 of the bayonet member 42 through the spade connector 12 so that it is engaged within the threaded bore 41 of the dead end plug 39, then screwing the bayonet member 42 into the threaded bore 41 until the spade contact 12 is securely fastened between the bayonet member 42 and the dead end plug 39.

When the disconnect is closed, as illustrated in FIG. 2, the contact fingers of the louvered band 45 engage the smooth sides of the axial bore 38 defined by the switchgear bushing rod 36. This disconnect is opened by moving the switchgear assembly away from the cable elbow connector 10, as illustrated in FIG. 3.

In the disconnect assembly illustrated in FIG. 3, the cable is connected to the disconnect assembly on the other side of the support structure 40. Consequently, a through type insulating bushing 46 is used rather than the dead end plug 39, and a bushing extension 47, similar to ESNA type 600BE bushing extension, is used instead of the elbow 10. The insert defining the threaded bore 41, for receiving the bayonet member 42, is either connected to, or integral with, one end of a current conducting bushing rod 48 extending from a free end tapered portion of the bushing 46. An incoming cable 13 can be connected to a threaded end 49 of the bushing rod 48 by another elbow connector 10, in the same manner as described for the cable connection of FIG. 1.

The bushing extension 47 includes an outer jacket 30a of molded conductive material, similar to the outer jacket 30 of the elbow connector 10, and an elastomeric inner layer 26a, similiar to the elastomeric inner layer 26 of the elbow connector 10. The outer jacket 30a and the elastomeric inner layer 26a define a first tapered opening 25a, similiar to the first tapered opening 25 of the elbow connector 10, for receiving the free end tapered portion 17 of the switchgear bushing 34. The outer jacket 30a and the elastomeric inner layer 26a also define an opposite second tapered opening 27a, similiar to the tapered opening 27 of the elbow connector 10, for receiving the tapered end portion of the bushing 46. The first and second tapered openings 25a and 27a of the bushing extension 47 are separated by a transversely extending annulus 51 of elastomeric material, for receiving the threaded portion 44 of the bayonet member 42.

The tapered end portion of the bushing 46 is fastened within the second tapered opening 27a of the bushing extension 47 by inserting the threaded portion 44 of the bayonet member 42 through the annulus 51 so that it is engaged within the threaded bore 41 of the bushing 46, then screwing the bayonet member 42 into the threaded bore 41 until the flanged portion 43 of the bayonet member 42 abuts against the annulus 51, as shown in FIG. 3.

Where the incoming power cables are used to supply power to other load circuits in addition to the load circuit supplied by the drawout switchgear, the switchgear cable disconnect on the source side of the switchgear can include an elbow connector 10, which is connected to a through type bushing 46 by the bayonet member 42, with the main power cables entering and leaving through the elbow connector 10 and a second cable connector connected to the threaded end 49 of the through bushing 46. In such an arrangement, the switchgear can be disconnected and withdrawn without interrupting the other circuits connected to the incoming power cables.

Figure 7:
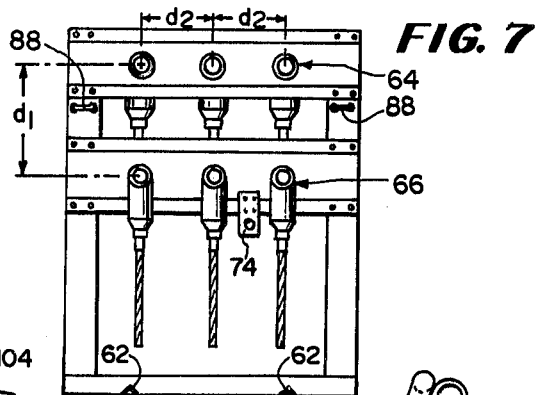

The movable carriage 50 of a three phase drawout switchgear assembly illustrated in FIGS. 4 and 5 includes three vacuum interrupters 52 mounted thereon. Each of these vacuum interrupters 52 is encased in a molded housing 53 of solid epoxy resin insulating material which includes a flanged portion 54 for mounting the vacuum interrupter 52 and extending load and source terminal sections 56, each of which define a switchgear bushing 34 and a portion intermediate the switchgear bushing 34 and the main body of the vacuum interrupter 52 suitable for mounting at least one bushing type current transformer 58 which is also encased in a body of epoxy resin insulating material. As shown in FIGS. 2 and 3, the molded housing 53 of each vacuum interrupter 52 between those portions of its switchgear bushings 34 which contact the outer conductive jacket 30 of the cable connector 10 or the bushing extension 47 is coated with a conductive or semiconductive material 59 to maintain a continuous ground path and shield between the incoming and outgoing cables connected to the vacuum interrupter 52. The moving contact operating rod (not shown) of each vacuum interrupter 52 extends downward from the flanged portion 54 thereof to a common operating mechanism (also not shown) mounted within the movable carriage 50. The movable carriage 50 is mounted on grooved or flanged wheels 60 to roll along fixed guide rails 62 attached to the stationary support structure 40 as shown in FIG. 6. The spacing and center line dimensions of the movable switchgear bushings 34 match those of the stationary switchgear disconnect members 64, 66 mounted on the fixed support structure 40, so that when the movable carriage 50 is rolled along the guide rails 62 toward stationary disconnect members 64, 66 the switchgear bushings 34 engages with respective stationary disconnect members 64, 66, to form completely shielded, waterproof current exchanges therebetween. Thus, the vertical center line distance $d_1$ between the three top stationary disconnect members 64 and the three bottom stationary disconnect members 66 mounted on the stationary support structure 40 shown in FIG. 6 is the same as the vertical center line distance $d_1$ between the two switchgear bushings 34 of each vacuum interrupter 52, shown in FIG. 4. Also, the horizontal distance $d_2$ between each pair of top and bottom stationary disconnect members 64, 66 shown in FIG. 7 is the same as the horizontal distance $d_2$ between the switchgear bushings 34 of adjacent vacuum interrupters 52 shown in FIG. 5.

The three lower stationary disconnect members 66 shown in FIG. 6 are similar to the stationary disconnect member shown in FIG. 2, whereas the three upper stationary disconnect members 64 of FIG. 6 are similar to the stationary disconnect member shown in FIG. 3, so that all six of the bayonet members; 42 are disposed in a common vertical plane to assure that each of these bayonet members 42 are connected or disconnected from its corresponding bushing rod 36 at the same time.

Figure 8:
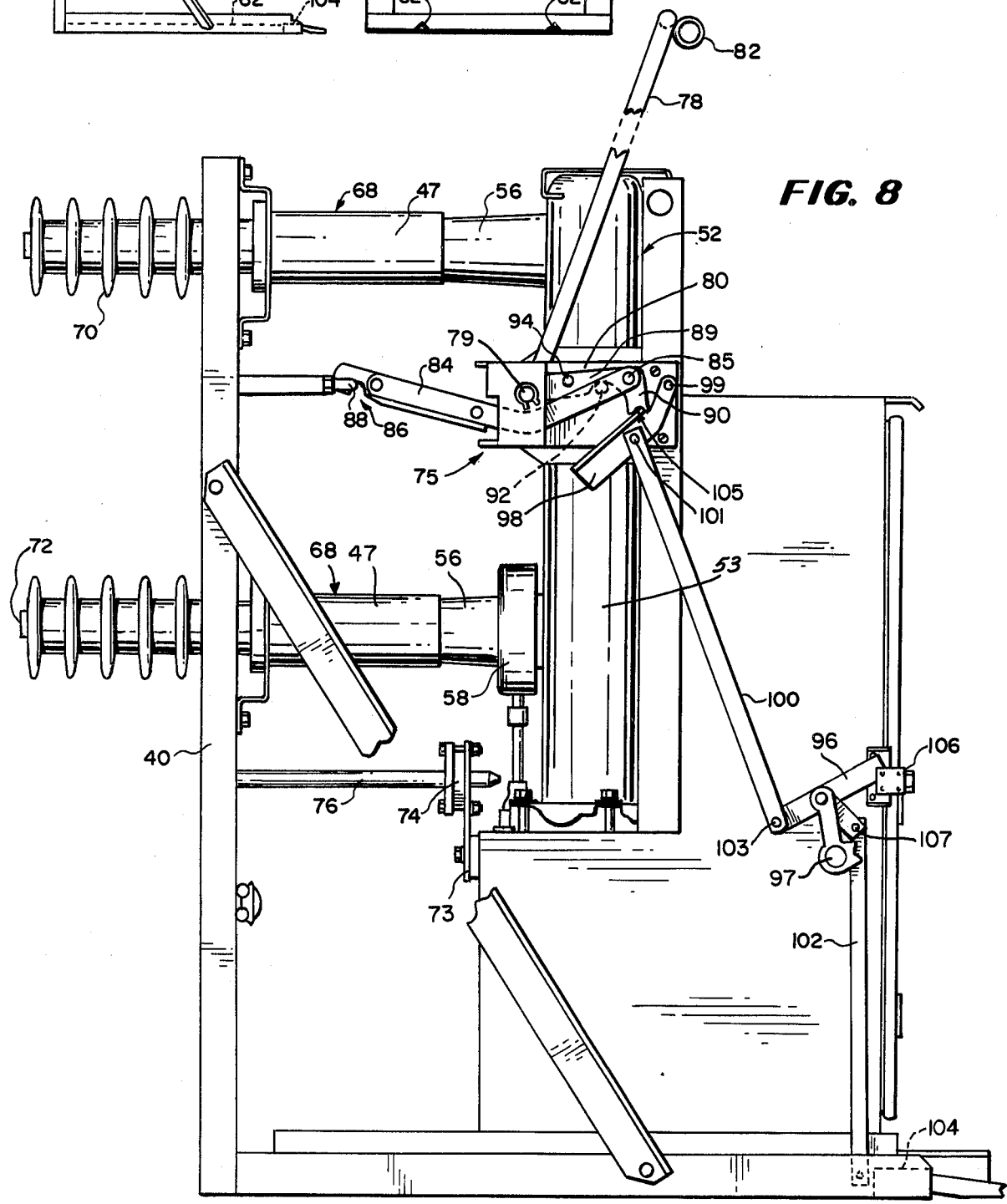
FIG. 8 is a side view of a pad-mounted drawout switchgear assembly, according to the invention.

As illustrated in FIG. 8, the drawout switchgear described herein can be easily modified to be pad-mounted for use with overhead lines by using the stationary switchgear disconnect members 68 rather than the disconnect members 64 or 66. The stationary switchgear disconnect member 68 is similar to that shown in FIG. 2, except that a transition bushing 70, fastened to the support structure 40 and having a free end 72 designed to receive an incoming source or load line and an opposite end connected into the bushing extention 47, is used instead of the through bushing 39. Also, if desired, the switchgear disconnect members 68 can be used to connect one side of the vacuum interrupters 52 to overhead lines and the stationary switchgear disconnect members 64 or 66 can be used to connect the other side of the vacuum interrupters 52 to underground cables.

The movable carriage 50 includes a ground bus 73 carrying a tulip finger assembly 74 which engages with a ground bayonet member 76 carried by the support structure 40 when the movable carriage 50 is in its connected position.

The switchgear disconnect operating mechanism 75 includes a U-shaped manual operating handle 78 pivotally attached at each end to the movable carriage 50 by a pivot pin 79 and carrying at each end a toggle lever 80. A metal ring or eyelet 82 is attached at the center of a handle 78 so that the switchgear disconnect mechanism 75 can be operated by one man with a standard hot line tool. An engaging link 84, which is pivotally mounted to the toggle lever 80 at one end by a pivot pin 85, has a hook-shaped open slot 86 at its opposite end for engaging a U-bolt 88 disposed on the stationary support structure 40. The toggle lever 80 has a main portion 89 which extends between the pivot pins 79 and 85, and an end portion 90 which extends from the pivot pin 85 orthogonally of the main portion 89. A pin 92, held by the engaging link 84, projects into the space between the main portion 89 and the end portion 90 of the toggle lever 80. The pin 92 abuts against the main portion 89 when the disconnect operating mechanism 75 is in its connected position, and abuts against the end portion 90 when the disconnect operating mechanism 75 is in its disconnected position. Thus, the pin 92 determines the connected position of the disconnect operating mechanism 75 and also limits the angular rotation of the engaging link 84 with respect to the toggle lever 80. The disconnected position of the operating mechanism 75 is determined by another pin 94, carried by the toggle lever 80, which abuts against a portion of the movable carriage 50 when the disconnect operating mechanism is in its disconnected position.

A trip and reset lever 96 is pivotable between a trip position and a reset position, and includes an eyelet 97 at one end for tripping or resetting the vacuum interrupters 52 with a standard hot line tool. A latch lever 98 is pivotally attached to the movable carriage 50 by a pivot pin 99 for rotation between a trip position and a reset position by a connecting link 100 which is pivotally connected to the latch lever 98 at one end by a pivot pin 101, and to the trip and reset lever 96 at an opposite end by a pivot pin 103. When the toggle lever 80 is in its connected position, and the latch lever 98 is in its reset position, an edge portion of the latch lever 98 extends into a V-notch 105 defined by the end portion 90 of the toggle lever 80, to thus prevent rotating the switchgear operating handle 78 downward to its disconnect position.

The movable carriage 50 is also interlocked with the stationary support structure 40 by the link 102, which is pivotally mounted at one end to the trip and reset lever 96 by a pivot pin 107 and extends downward adjacent the side of a plate 104 of the stationary support structure 40 when the trip and reset lever 96 is in its reset position, to prevent the movable carriage 50 from being moved into its connected position. When the trip and reset lever is rotated to its trip position, the link 102 is raised so that its lower end is higher than the top of the plate 104, so that the movable carriage 50 can be moved into its connected position.

A key-operated interlock device 106, for example, a Kirk key interlock, is pivotally mounted between the movable carriage 50 and the trip and reset lever 96, so that when the trip and reset lever 96 is in its reset position, the key interlock bolt can be extended against the trip and reset lever 96 to lock the trip and reset lever 96 in its reset position.

SEQUENCE OF OPERATION

Figure 9:
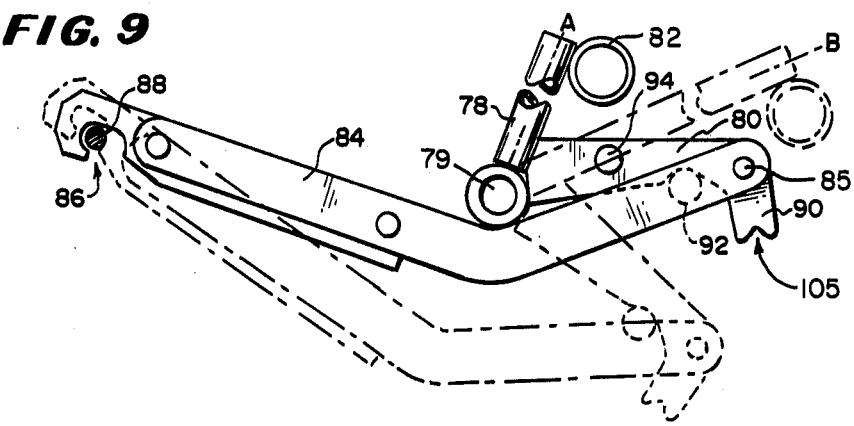
FIGS. 9, 9A, and 9B are simplified schematic views of the switchgear disconnect operating mechanism in its connected, disconnected, and intermediate positions, respectively.
Figure 9A:
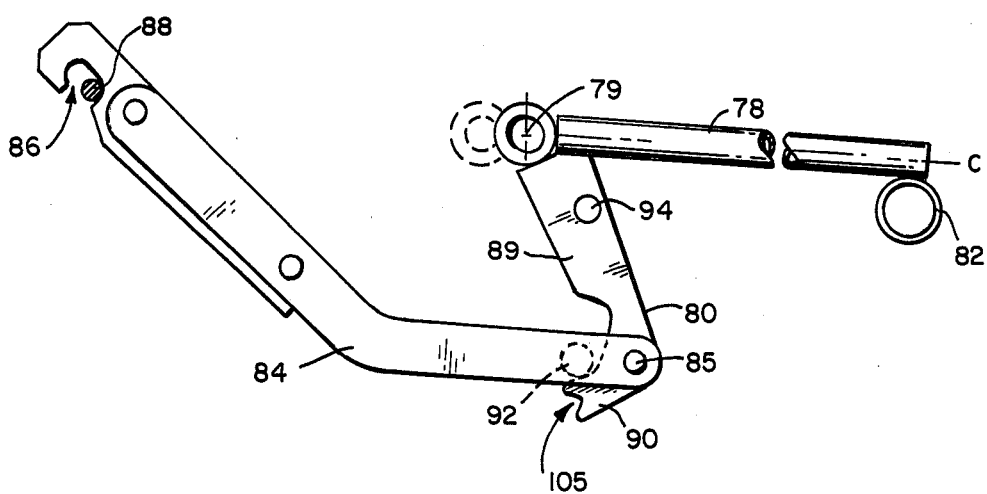
Figure 9B:
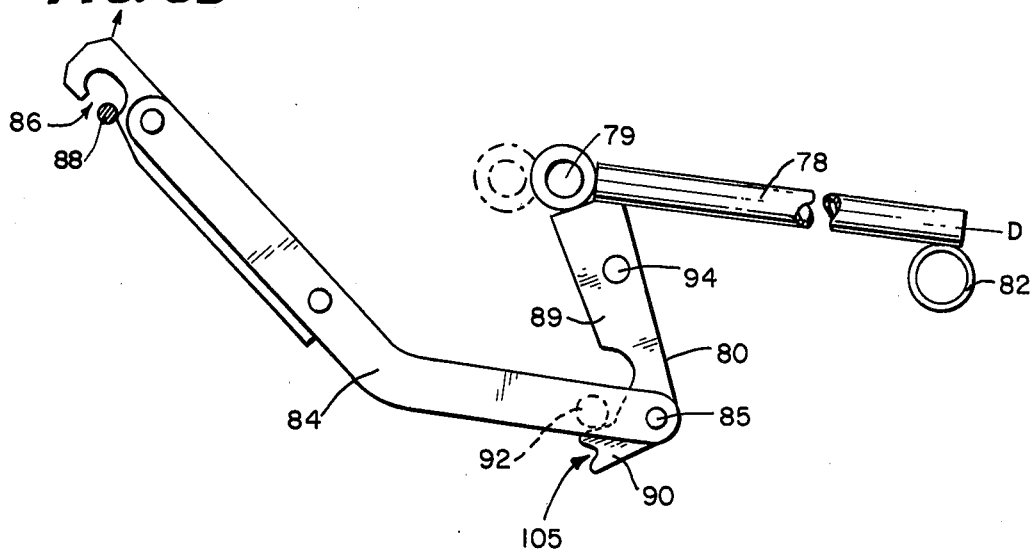

When the movable carriage 50 is in its connected position, the vacuum interrupters 52 closed, and the trip and reset lever 96 locked in its reset position by the key interlock 106, as illustrated in FIG. 8, in order to disconnect the vacuum interrupters 52, the key interlock 106 must be operated to unlock the trip and reset lever 96. The trip and reset lever 96 can then be rotated to its trip position to open the vacuum interrupters 52 and rotate the latch lever 98 to unlatch the toggle lever 80. The switchgear disconnect operating handle 78 can then be rotated downward from its connected position A to its disconnect position C or D as illustrated in FIGS. 9, 9A and 9B.

When the switchgear operating mechanism 75 is in its connected position, the toggle lever 80 is slightly over its toggle point, that is the point at which the axis of the pivot pin 85 falls on the center line between the hooked portion of the U-bolt 88 and the axis of the pivot pin 79. This assures that sufficient pressure is continuously applied to the movable carriage 50 to maintain the dielectric and environmental seal between the switchgear bushings 34 and the bushing extensions 47. When the operating handle 78 is moved towards the disconnect position, the toggle lever 80 is rotated through its toggle point and the engaging link 84 starts to move towards the U-bolt 88 until the back portion of the slot 86 abuts against the U-bolt 88, when the operating handle 78 is in the position B shown by dashed lines in FIG. 9. As rotation of the operating handle 78 is continued, the movable carriage 50 will be moved away from the bushing extensions 47 to break the dielectric and environmental seal between these cable connectors and the switchgear bushings 34 and to disconnect the current carrying contacts 38 and 42. When the operating handle 78 has been rotated to the position C, as shown in FIG. 9A, the pin 92 carried by the engaging link 84 abuts against the end portion 90 of the toggle lever 80. In this position, the movable carriage 50 can be rolled away from the bushing extensions 47, and the engaging link 84 will ride up and over the U-bolt 88, then return to the same position with the pin 92 in contact with the end portion 90 of the toggle lever 80, so that when the movable carriage 50 is again moved into its connected position, the engaging link 84 will ride up and over the U-bolt 88 to again engage the U-bolt 88 within the slot 86 of the engaging link 84. If the operating handle 78 is rotated beyond the position C to position D shown in FIG. 9B, the engaging link 84 will rotate with the toggle lever 80 about the axis of rotation of the operating handle 78, causing the hooked end of the engaging link 84 to be raised and the engaging link 84 to be completely disengaged from the U-bolt 88. However, it is desirable that the U-bolt 88 remain within the slot 86 so that when the movable carriage is moved from its disconnected position toward its connected position, the engaging link 84 will abut against the U-bolt 88 within the slot 86 so that the disconnect operating handle 78 must be rotated to allow further movement of the movable carriage 50. For this reason, the pin 94 is disposed on the toggle lever 80 so that it will abut against a portion of the movable carriage 50 when the hooked end of the engaging lever 84 has been raised to position D, as shown in FIG. 4. The U-bolt 88 is still within the slot 86 but the engaging link 84 is entirely free of the U-bolt 88, as shown in FIG. 9B. When the operating handle 76 has been rotated to its fully disconnected position D, the movable carriage 50 can be rolled completely free of the bushing extensions 47, to thus meet any requirements of a visible break disconnect.

When the movable carriage 50 is completely disconnected, and the vacuum interrupters 52 are open, as shown in FIG. 4, the vacuum interrupters 52 can be reconnected by moving the movable carriage 50 toward the bushing extensions 47 and the U-bolt 88 until the U-bolt 88 is seated within the slot 86 of the engaging link 84. Then the switchgear operating handle 78 can be rotated to its connected position to engage the disconnect fixed and moving contacts 42, 38 and to hold the switchgear bushings 34 within the bushing extensions 47 with sufficient pressure to form a dielectric and environmental seal therebetween.

If an attempt is made to move the movable carriage 50 into its connected position when the vacuum interrupters 52 are closed, the trip and reset lever 96 will be in its reset position and thus the lower end of the lock link 102 will be below the level of the plate 104 of the stationary support structure 40. When an attempt is made to move the movable carriage 50 into its connected position, the end of the lock link 102 will strike against the side of the plate 104 to prevent any further movement of the movable carriage 50.

It is apparent that many modifications could be made to the specific embodiments of the invention described herein. For example, the bayonet and socket current exchange members 38, 42 could be interchanged, the louvered band 45 disposed within the socket 38 rather than about the bayonet 42, and other types of circuit interrupters could be employed. Therefor it is intended that the scope of this invention be limited only by the appended claims.

What is claimed is:

1. A high voltage drawout switchgear assembly which comprises:

a stationary support structure, which includes at least one guide member defining a fixed path;

a movable carriage, which is disposed on said stationary support structure for movement between a connected position and a disconnected position along the fixed path defined by said at least one guide member;

circuit interrupter means, which is disposed on said movable carriage, said circuit interrupter means having at least one set of interrupter contacts which can be closed or opened for connecting or disconnecting a distribution power load circuit to an electric power source, and having a plurality of incoming and outgoing insulating interrupter bushings, each interrupter bushing having a free end tapered portion, each interrupter bushing including a current conducting interrupter bushing rod extending therethrough, said interrupter bushing rod of each interrupter bushing having one end which is electrically connected with one of said interrupter contacts and an opposite free end which extends from said free end of said interrupter bushing;

interrupter operating means, disposed on said movable carriage, for operating said circuit interrupter means;

a plurality of high voltage distribution cable connection devices, equal in number to said plurality of incoming and outgoing interrupter bushings, each cable connection device being associated with one of said interrupter bushings, each cable connection device having an outer jacket and an elastomeric inner layer which define a first tapered opening for receiving the free end of its associated interrupter bushing, each cable connection device being disposed on said stationary support structure in alignment with its associated interrupter bushing so that each interrupter bushing is simultaneously inserted into its associated cable connection device as said movable carriage is moved along said fixed path toward its connected position;

switchgear disconnect operating means for moving said movable carriage along said fixed path between its disconnected position and its connected position, and for continuously exerting a force on said movable carriage when said movable carriage is in its connected position so that the free end of each interrupter bushing presses against said elastomeric inner layer of its associated cable connection device to form a waterproof seal therebetween;

interlock means for preventing said movable carriage from being moved into or away from its connected position when said at least one set of interrupter contacts are closed;

a plurality of socket and plug type connector assemblies, equal in number to said cable connection devices, each socket and plug type connector assembly being associated with one of said cable connection devices and one of said interrupter bushing rods, each socket and plug type connector assembly comprising a stationary contact member which is carried by its associated cable connection device within the first opening of said associated connection device, a movable contact member which is disposed at the free end of its associated interrupter bushing rod, said movable contact member being disengaged and spaced from said stationary contact member when said movable carriage is disposed in its disconnected position, and said movable contact member being engaged with said stationary contact member when said movable carriage is disposed in its connected position, and a current exchange member, carried by one of said contact members, which makes sliding contact with the other of said contact members, said current exchange member comprising a louvered metal band which is disposed between said movable contact member and said stationary contact member when said movable carriage is in its connected position, said louvered metal band having transversely extending expanses which are bent or twisted to provide resilient contact fingers, each contact finger having one side in spring-loaded contact with the movable contact member and an opposite side in spring-loaded contact with said stationary contact member, for maintaining contact with said stationary and movable contact members during high fault conditions;

said socket and plug type connector assemblies being disposed so that all movable contact members simultaneously engage in sliding contact with their respective stationary contact members as said movable carriage is moved along said fixed path from its disconnected position toward its connected position;

first current conducting means for connecting said stationary contact member of each socket and plug type connector assembly associated with one of said incoming interrupter bushing to said electric power source; and second current conducting means for connecting said stationary contact member of each socket and plug type connector assembly associated with one of said outgoing interrupter bushing to said distribution load circuit.

2. A drawout switchgear assembly, as described in claim 1, wherein:

said stationary contact member of each socket and plug type connector assembly comprises a bayonet contact member, having a threaded end portion and an intermediate flange portion for connecting said bayonet contact member to one of said current conducting means, and an opposite end portion for engaging within said movable contact member of said socket and plug type connector assembly; and said movable contact member of each socket and plug type connector assembly comprises its associated interrupter bushing rod, whose free end defines an open cavity or recess for receiving said bayonet contact member.

3. A drawout switchgear assembly, as described in claim 2, wherein said current exchange member of each socket and plug connector assembly is disposed about said opposite end portion of said bayonet contact member.

4. A drawout switchgear assembly, as described in claim 2, wherein;
at least one of said cable connection devices is a standard bushing extension, in which said outer jacket and said elastomeric inner layer define a second tapered opening opposite said first opening, said first and second openings being separated by a transversely extending annulus of elastomeric material which defines a third opening therethrough for receiving said threaded end portion of said bayonet contact member; and
at least one of said current conducting means includes a transition bushing disposed on said stationary support structure and having a current conducting rod extending therethrough between opposite first and second ends of said transition bushing, said rod having a first end extending from said first end of said transition bushing which defines a threaded bore therein for receiving said threaded end portion of said bayonet contact member and a second end extending from said second end of transition bushing which includes means for connecting said transition bushing rod to an overhead electric power line, said transition bushing having a first end tapered portion which is inserted into said second opening of said bushing extention, and fastened therein by said threaded end portion of said bayonet contact member which extends through said third opening of said bushing extension into said threaded bore of said transition bushing rod, to form a water-tight seal between said transition bushing and said bushing extention.

5. A drawout switchgear assembly, as described in claim 2, wherein:
at least one of said cable connection devices is a standard bushing extention, in which said elastomeric outer jacket and said inner layer defines a second tapered opening opposite said first opening, said first and second opening being separated by a transversely extending annulus of elastomeric material which defines a third opening therethrough for receiving said threaded end portion of said bayonet contact member; and
at least one of said current conducting means includes a through type bushing disposed on said stationary support structure having a bushing rod extending therethrough between opposite first and second ends of said through bushing, said through bushing rod having a first end extending from said first end of said through bushing which defines a threaded bore therein for receiving said threaded end portion of said bayonet contact member, and a second opposite end extending from said second end of said through bushing which comprises a threaded stud suitable for connection to a standard cable elbow connector, said through bushing having a first end tapered portion which is inserted into said second opening of said bushing extention and held therein by said bayonet contact member whose threaded end portion extends through said third opening of said bushing extention into said threaded bore of said through bushing rod to form a waterproof seal between said through bushing and said bushing extention, said bushing extention including an opposite second end tapered portion suitable for insertion into a standard cable elbow connector.

6. A drawout switchgear assembly, as described in claim 2, wherein:
at least one of said cable connection devices is a standard cable elbow connector, in which said outer jacket and said elastomeric inner layer define a second tapered opening therethrough opposite said first opening and a common passage between said first and second openings, said jacket and said inner layer also defining a third opening orthagonal to said first and second openings and a second passage joining said third opening and said common passage, for receiving a high voltage electric cable;
said switchgear assembly further comprises at least one insulating dead end plug disposed on said stationary support structure having a first end which defines a threaded bore therein for receiving said threaded end portion of said bayonet contact member, and a first end tapered portion which is inserted into said second tapered opening of said cable elbow connector to form a water tight seal therebetween; and
said current conducting means includes at least one high voltage electric cable having an end portion inserted into said third opening of said cable elbow connector to form a waterproof seal therebetween, said cable end portion carrying a spade connector which defines a hole therethrough, said spade connector extending into said common passage and secured therein by said bayonet contact member, whose threaded end portion extends through said spade connector hole into said threaded bore of said dead end plug.

7. A drawout switchgear assembly, as described in claim 2, wherein;
each cable connection device associated with an incoming switchgear bushing comprises a standard cable elbow connector, in which said outer jacket and said elastomeric inner layer define a second tapered opening opposite said first opening for receiving a tapered end portion of a through bushing to form a waterproof seal therebetween, said jacket and said inner layer also defining a common passage between said first and second openings, a third opening orthagonal to said first and second openings, and a second passage joining said third opening and said common passage, for receiving therein a high voltage electric cable;
said first current conducting means includes at least one through type bushing disposed on said stationary support structure having a bushing rod extending therethrough between opposite first and second ends of said through bushing, said through bushing having a first end extending from said first end of said through bushing which defines a threaded bore therein for receiving said threaded end portion of said bayonet contact member, and a second opposite end extending from said second end of said through bushing which includes means for connecting said through bushing rod to a high voltage electrical conductor, said through bushing having a first end tapered portion which is inserted into said second opening of said elbow connector to form a waterproof seal therebetween, said first current conductive means also including at least one high voltage electric cable having an end portion inserted into said third opening of said cable elbow connector to form a waterproof seal therebetween, said cable end portion carrying a spade connector which defines a hole therethrough, said spade connector extending into said common passage and secured therein by said bayonet contact member, whose threaded end portion extends through said spade connector hole into said threaded bore of said through bushing rod;

whereby said drawout switchgear can be opened and disconnected from said electric power source without disconnecting said high voltage cable from said through bushing connecting rod.

8. A drawout switchgear assembly, as described in claim 1, wherein:

the material of said outer jacket of each cable connection device is an electrically conductive material;

said first conductive means comprises of at least one shielded high voltage electric cable having an outer conductive layer in contact with said outer conductive jacket of said cable connection device; and said circuit interrupter means includes at least one vacuum interrupter encased in a molded housing of solid insulating material which defines one of said incoming switch-gear bushings and one of said outgoing switchgear bushings, said molded housing of said vacuum interrupter being coated with a conductive material between those portions of said switchgear bushings which contact the outer conductive jackets of the respective cable connection devices connecting with said vacuum interrupter, to thus maintain a continuous ground path and shield between the incoming and outgoing cables connected to said vacuum interrupter.

* * * * *